(12) United States Patent
Craig et al.

(10) Patent No.: US 7,710,683 B2
(45) Date of Patent: *May 4, 2010

(54) MULTI-ARM DISK DRIVE SYSTEM HAVING INTERLEAVED READ/WRITE OPERATIONS AND METHOD OF CONTROLLING SAME

(75) Inventors: Jesse E. Craig, S. Burlington, VT (US); Stanley B. Stanski, Essex Junction, VT (US); Scott T. Vento, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 12/127,108

(22) Filed: May 27, 2008

(65) Prior Publication Data

US 2008/0225431 A1 Sep. 18, 2008

Related U.S. Application Data

(63) Continuation of application No. 11/278,283, filed on Mar. 31, 2006, now Pat. No. 7,385,781.

(51) Int. Cl.
*G11B 5/596* (2006.01)
(52) U.S. Cl. ............... 360/78.08; 360/64; 360/78.04
(58) Field of Classification Search ............... None
See application file for complete search history.

(56) References Cited

U.S. PATENT DOCUMENTS

| | | | |
|---|---|---|---|
| 4,270,154 A | 5/1981 | Crawford | |
| 5,177,652 A | 1/1993 | Yamaguchi et al. | |
| 5,293,282 A | 3/1994 | Squires et al. | |
| 5,343,347 A | 8/1994 | Gilovich | |
| 5,355,486 A | 10/1994 | Cornaby | |
| 6,005,743 A | 12/1999 | Price et al. | |
| 6,005,747 A | 12/1999 | Gilovich | |
| 6,847,504 B1 | 1/2005 | Bennett et al. | |
| 6,883,062 B2 | 4/2005 | Susnjar | |
| 7,102,842 B1 | 9/2006 | Howard | |
| 2003/0112539 A1 | 6/2003 | Shu | |
| 2007/0035868 A1* | 2/2007 | van Zyl | 360/69 |

OTHER PUBLICATIONS

First Office Action mailed Nov. 16, 2007 regarding parent U.S. Appl. No. 11/278,283, filed Mar. 31, 2006.
Response to First Office Action mailed Nov. 16, 2007, dated Jan. 23, 2008 regarding parent U.S. Appl. No. 11/278,283, filed Mar. 31, 2006.
Notice of Allowability dated Apr. 8, 2008 with regard to parent U.S. Appl. No. 11/278,283, filed Mar. 31, 2006.

* cited by examiner

*Primary Examiner*—Jason C Olson
(74) *Attorney, Agent, or Firm*—Downs Rachlin Martin PLLC

(57) ABSTRACT

A hard disk drive system that includes one or more rotating data storage platters, a drive controller and multiple actuator assemblies and corresponding respective read/write heads. The actuator assemblies are separately moveable for performing separate data seeks. The controller is configured to interleave the seek and read/write operations of the multiple actuator assemblies and read/write heads with one another.

16 Claims, 2 Drawing Sheets ary order and requiring a
plurality of corresponding respective seeks and a plurality of
corresponding respective data transfers. The disk drive system includes a housing; at least one platter rotatably mounted within the housing, the at least one platter having a first data storage surface containing a plurality of surficial data storage locations; a first read/write head movably mounted within the housing and configured to read and write data to ones of the plurality of surficial data storage locations; a first actuator assembly supporting the first read/write head and configured to move the first read/write head so that the first read/write head is able to access the plurality of surficial data storage locations; at least a second read/write head movably mounted within the housing and configured to read and write data to ones of the plurality of surficial data storage locations; a second actuator assembly supporting the second read/write head and configured to move the second read/write head independently of the first read/write head and so that the second read/write head is able to access the plurality of surficial data storage locations; and a controller operatively connected to the first actuator assembly and the second actuator assembly, the controller responsive to the plurality of data transfer requests by interleaving the plurality of corresponding respective seeks between the first actuator assembly and the second actuator assembly, the controller operatively configured to stall ones of the plurality of corresponding respective data transfers as needed maintain the plurality of corresponding respective data transfers in an order consistent with the temporally sequential order of plurality of data transfer requests.

MULTI-ARM DISK DRIVE SYSTEM HAVING INTERLEAVED READ/WRITE OPERATIONS AND METHOD OF CONTROLLING SAME

RELATED APPLICATION DATA

This application is a continuation application of U.S. Nonprovisional patent application Ser. No. 11/278,283 filed on Mar. 31, 2006 and titled "Multi-Arm Disk Drive System Having Interleaved Read/Write Operations and Method of Controlling Same," which is incorporated herein by reference in its entirety.

FIELD OF THE INVENTION

The present invention generally relates to the field of non-volatile data storage. In particular, the present invention is directed to a multi-arm disk drive system having interleaved read/write operations and method of controlling same.

BACKGROUND OF THE INVENTION

Hard disk drives are used in many applications where relatively fast, economical, non-volatile mass storage is desired. For example, hard disk drives are commonly used in computer servers, mainframe computers, personal computers, laptop computers, digital video recorders, music and multimedia devices, personal digital assistants, digital cameras and cellular telephones, among other things. Hard disk technology has evolved significantly since the first commercial hard disk drive became available in 1956.

Present hard disk drives typically include a plurality of platters that spin at a constant angular velocity about a common rotational axis, or spindle. Common form factors, or platter diameters, of present generation hard disk drives are 3.5 in., 2.5 in., 1.8 in., 1 in. and 0.85 in. That said, other diameter platters are available. The platters are typically made of a non-metallic material, e.g., glass or aluminum, coated on both major surfaces with a magnetic recording material, typically iron oxide, that form the data storage surfaces of the drive. Present hard disk drives typically have a single armature that moves multiple read/write heads, one for each data storage surface, in unison with one another.

Several more recent designs utilize multiple read/write heads per data storage surface and move these multiple heads with corresponding respective independent armatures. In some of these designs, the multiple heads are used for redundancy or for increasing the speed of a given data transfer (read or write) operation by using some or all of the read/write heads simultaneously for that data transfer. In others of these designs, the multiple heads per data storage surface are controlled so that the read/write head closest to the location of the data at any given time is used for the data transfer. The one or more remaining read/write heads for that surface do not participate in that data transfer and await subsequent data transfer requests that call them into action. While these recent simultaneous read/simultaneous write and closest-to-the-data designs increase the speed of the respective hard disk drives, improvement in the average seek time, i.e., the average time it takes for the read/write head(s) to be moved to a desired data transfer location over a plurality of read/write requests, is highly desirable.

SUMMARY OF THE INVENTION

In one aspect, the present invention is directed to a disk drive system responsive to a plurality of data transfer requests received in a temporally sequenti In another aspect, the present invention is directed to a method of controlling a disk drive that includes at least one platter having at least one storage surface, the disk drive further including at least two read/write heads in working relationship with the at least one storage surface. The method includes receiving, in a temporally sequential order, a plurality of data transfer requests that require a plurality of corresponding respective seeks and a plurality of corresponding respective data transfers; moving the at least two read/write heads so as to interleave the plurality of corresponding respective seeks with one another; activating the at least two read/write heads so as to perform the plurality of corresponding respective data transfers relative to the at least one storage surface; and selectively stalling each of the plurality of corresponding respective data transfers as needed to maintain the plurality of corresponding respective data transfers in an order consistent with the temporally sequential order of the plurality of data transfer requests.

In yet another aspect, the present invention is directed to a disk drive system responsive to a plurality of temporally sequential data transfer requests requiring a plurality of corresponding respective seeks and a plurality of corresponding respective data transfers. The disk drive system includes a housing; at least one platter rotatably mounted within the housing, the at least one platter having a first data storage surface containing a plurality of surficial data storage locations; a first read/write head movably mounted within the housing and configured to read and write data to ones of the plurality of surficial data storage locations; a first actuator assembly supporting the first read/write head and configured to move the first read/write head so that the first read/write head is able to access the plurality of surficial data storage locations; at least a second read/write head movably mounted within the housing and configured to read and write data to one of the plurality of surficial data storage locations; a second actuator assembly supporting the second read/write head and configured to move the second read/write head independently of the first read/write head and so that the second read/write head is able to access the plurality of surficial data storage locations; and a controller operatively connected to the first actuator assembly and the second actuator assembly, the controller responsive to the plurality of temporally sequential data transfer requests by performing the plurality of corresponding respective seeks in the temporally sequential order by alternating the plurality of corresponding respective seeks between the first actuator assembly and second actuator assembly, the controller operatively configured to stall ones of the plurality of corresponding respective data transfers as needed to maintain the plurality of corresponding respective data transfers in an order consistent with the temporally sequential order of the plurality of data transfer requests.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
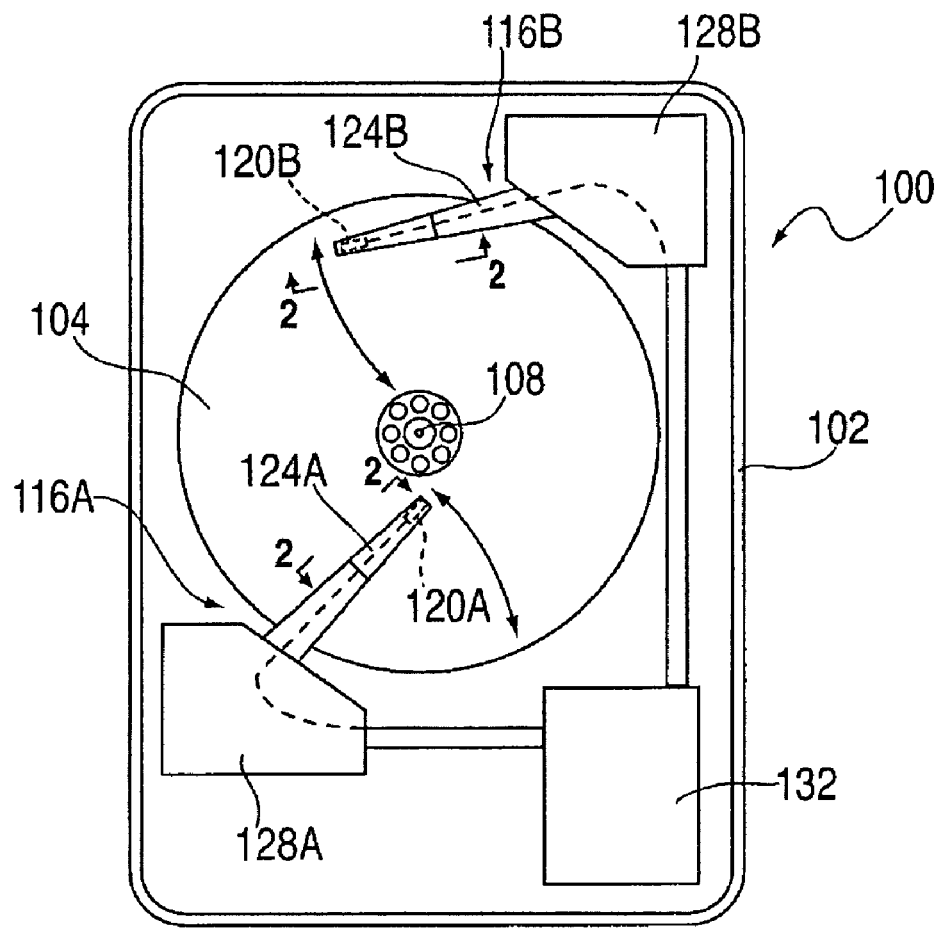
FIG. 1 is a plan view of a disk drive system of the present invention with the cover removed.
Figure 2:
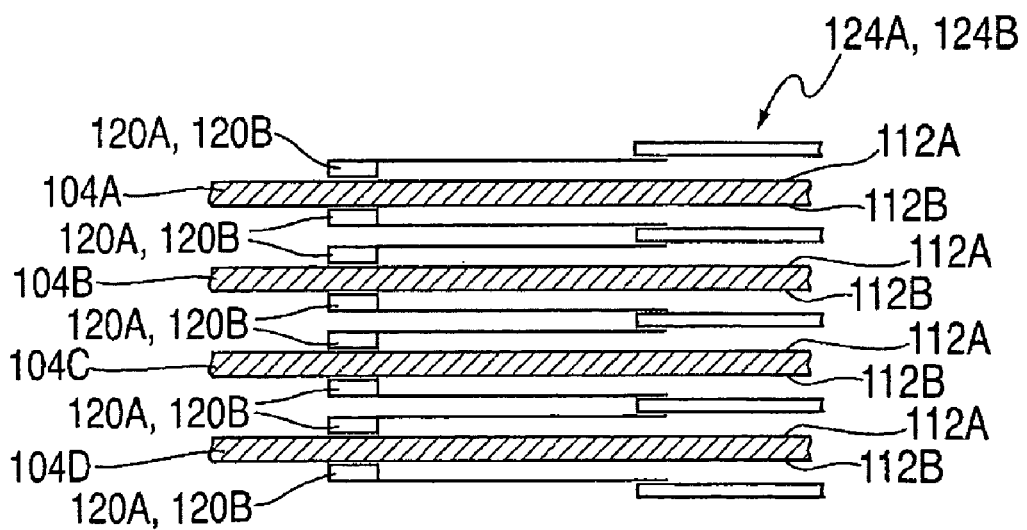
FIG. 2 is an enlarged cross-sectional view of the disk drive system of FIG. 1.

Referring now to the drawings, FIGS. 1 and 2 illustrate a multi-armature hard disk drive (HDD) system 100 of the present invention that, as discussed below in much more detail, includes various features that reduce the average seek time of the system relative to conventional single and multi-arm HDD systems. HDD system 100 may include a housing 102 that contains one or more platters 104, such as the four platters 104A-D particularly shown in FIG. 2, that are rotatable about a common spindle 108 relative to the housing. Each platter 104A-D may have first and second data storage surfaces 112A-B, which may be provided with its data storage capacity in any suitable manner. For example, each data storage surface 112A-B may have a magnetic storage surface comprising iron oxide or other magnetic material. The details of manufacturing platters 104A-D suitable for use with the present invention are well known in the art and, therefore, need not be described in any detail herein for those skilled in the art to understand the broad scope of the present invention.

HDD system 100 may further include a plurality of actuator assemblies, e.g., the two armature assemblies 116A-B shown, that each support and move a set of read/write heads 120A-B independently of one another. The number of read/write heads 120A-B on each assembly 116A-B will typically correspond to the number of data storage surfaces 112A-B. In this connection, it is noted that any given read or write request may involve the use of one or more of read/write heads 120A or read/write heads 120B in satisfying that request. Each armature assembly 116A-B may include an armature 124A-B and an actuator 128A-B operatively configured to move the respective armature during a data location seek. Each actuator 128A-B may include, e.g., a linear motor, voice coil, etc. (not shown) for moving the respective armature 124A-B. Those skilled in the art will readily appreciate that while pivoting type actuator assemblies 116A-B are shown, other types of actuator assemblies, e.g., linear movement type actuator assemblies, may also be used with a disk drive system of the present invention. A variety of multi-head arrangements and actuator assembly types suitable for use with the present invention are shown in U.S. Pat. No. 6,883,062 to Susnjar, which is incorporated herein by reference for its disclosure of the various arrangements and actuator assembly types.

The operation of each armature assembly 116A-B and each read/write head 120A-B may be controlled by a suitable controller 132, which may also provide an interface between HDD system 100 and whatever device(s) (not shown), e.g., one or more computer servers, mainframe computers, personal computers, laptop computers, digital video recorders, music and multimedia devices, personal digital assistants, digital cameras, cellular telephones, etc., to which the HDD system is connected. As those skilled in the art will appreciate, controller 132 may be implemented in any suitable hardware, software or combination of hardware and software. The functionality of controller 132 is discussed in much more detail below.

In general, HDD system 100 receives from such device(s) one or more continual flows of data transfer requests, i.e., requests for either reading specific data from data storage surfaces 112A-B of platters 104A-D or writing specific data to the data storage surfaces. Accompanying the write requests, controller 132 will typically also receive the data to be written to data storage surfaces 112A-B. Consequently, controller 132 may include the functionality required to coordinate the writing of data to data storage surfaces 112A-B so that it may be read in response to an appropriate read request. Controller 132 will typically also output the data corresponding to the read requests. Therefore, controller 132 may also be provided with functionality required to coordinate the data read from the data storage surfaces 112A-B with the corresponding respective read requests. It is noted that while controller 132 is shown located inside housing 102, in other embodiments the controller may be located outside the housing.

Figure 3:
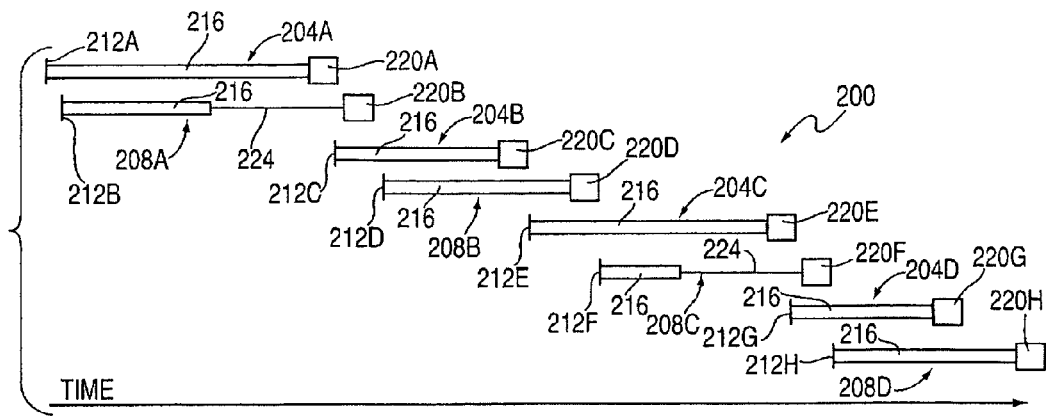
FIG. 3 is a timing diagram illustrating the seek and data transfer operations of the disk drive system of FIG. 1.

As mentioned above, an important feature of HDD system 100 is its ability to reduce the average seek time needed to respond to a set of data transfer requests. This may be accomplished by interleaving with one another the data transfer operations, e.g., seek-and-write or seek-and-read operations, performed by HDD system 100 in response to the various incoming data transfer requests. This interleaving functionality may be provided by controller 132. For example, one interleaving scheme suitable for use with HDD system 100 of FIGS. 1 and 2 is illustrated by the timing diagram 200 of FIG. 3. Referring to FIG. 3, and also to FIGS. 1 and 2, timing diagram 200 of FIG. 3 illustrates the data transfer operation sets 204A-D of armature assembly 116A and read/write head 120A and the data transfer operation sets 208A-D of armature assembly 116B and read/write head 120B corresponding to an exemplary set of eight temporally sequential data transfer requests 212A-H. Each data operation set includes a seek 216 and a data transfer 220A-H, i.e., either a read or write depending upon the nature of the corresponding data transfer request 212A-H.

The interleaving scheme illustrated by timing diagram 200 is based on the concept of performing the data transfers 220A-H of the multiple data transfer operation sets 204A-D, 208A-D in the same temporally sequential order as the receipt of data transfer requests 212A-H. This is accomplished by adding a stall cycle 224 to each data transfer operation set 204A-D, 208A-D in which the seek 216 of that set is finished before the data transfer 220A-H of the immediately prior data transfer request 212A-H is completed. The length of each stall cycle 224 may be the length of time needed for the immediately preceding data transfer 220A-H to end, plus any time needed for controller 132 or other circuitry to be ready to handle another data transfer. Of course, if a seek 216 and corresponding data transfer 220A-H are completed for a particular data transfer request 212A-B before the seek is completed for the immediately following request, then a stall cycle is not necessary.

Maintaining the temporal sequential order in the data transfers 220A-H, as is done in the interleaving scheme illustrated in FIG. 3, generally simplifies the functionality of controller 132 in that the controller is not responsible for tracking and correlating unordered data transfers, particularly reads, with the temporally sequentially ordered data transfer requests 212A-H. That said, in alternative embodiments of the present invention, the interleaving of data request operation need not result in such ordered data transfers. For example, in one alternative embodiment (not shown) as soon as a data transfer is complete, the next seek to perform may take place. If the corresponding controller were configured to handle only one data transfer at a time, a stall cycle could be added to prevent a data bus conflict. On the other hand, if the controller were configured to simultaneously handle a number of data transfers equal to the number of read/write heads, then such stall cycles would not be needed. In either of these alternative interleaving schemes, the controller or other circuitry would need to include functionality for correlating the data read transfers, particularly the reads, with the corresponding respective data read requests. This would add to the complexity of the controller or other circuitry.

Figure 4:
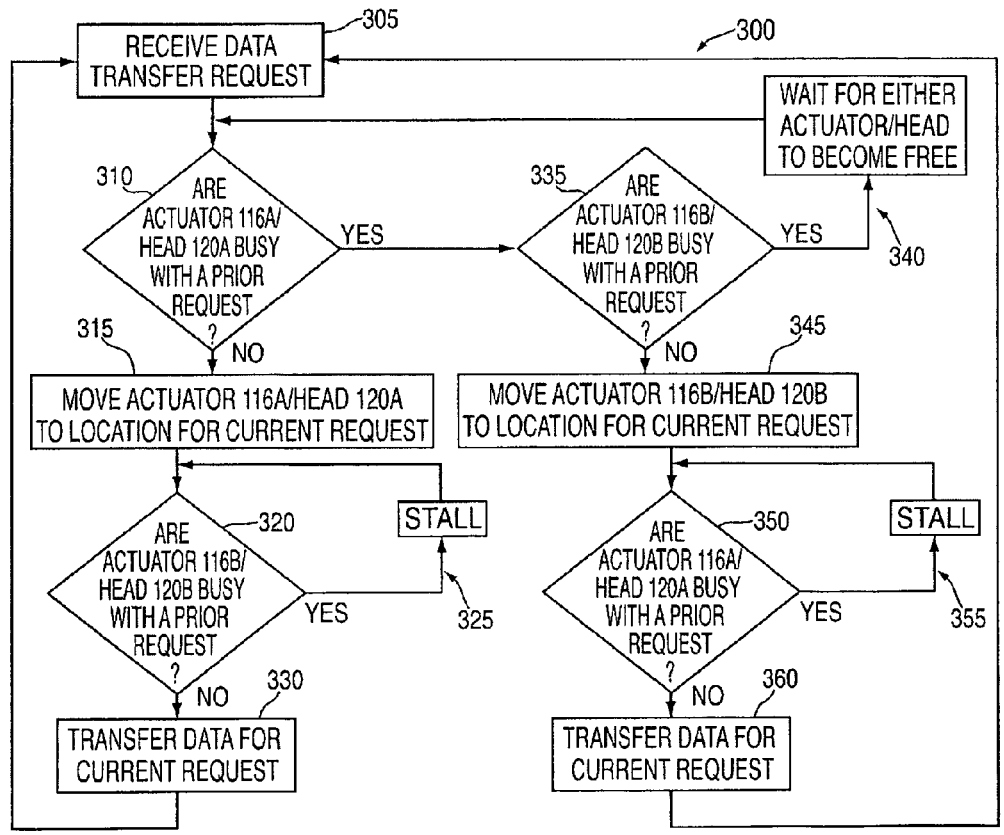
FIG. 4 is flow diagram showing an interleaving scheme of controlling the seek and data transfer operations of the disk drive system of FIG. 1.

Referring to FIG. 4, and also to FIGS. 1-3, FIG. 4 illustrates a flow diagram 300 for performing the interleaving scheme illustrated in timing diagram 200 of FIG. 3 within HDD system 100 of FIGS. 1 and 2. At step 305, controller 132 receives a data transfer request. At step 310, controller 132 determines whether or not armature assembly 116A and/or corresponding read/write head(s) 120A are busy handling a prior data transfer request. If not, at step 315 controller 132 activates armature assembly 116A so as to position the appropriate read/write head 120A at the proper location for performing the requested data transfer to or from the corresponding data storage surface 112A-B. Step 315 may be referred to as a seek step. After seek step 315, at step 320 controller 132 determines whether or not the other armature assembly 116B and/or corresponding read/write head(s) 120B are busy with a prior request. If so, the interleaving scheme enters a stall loop 325 that continues to execute until the other armature assembly 116B and/or corresponding read/write head(s) 120B are done with the prior request. It is noted that the effect of stall loop 325 is not illustrated in FIG. 3. However, referring to FIG. 3, its effect can be visualized by extending seek 216 associated with data transfer request 212D beyond the data transfer 220E associated with request 212E. In this case, stall loop 325 would not permit the data transfer 220E of data transfer request 212E to occur until after the data transfer 220D of request 212D by inserting a stall cycle 224 between the seek 216 and the data transfer 220E of request 212E.

If, on the other hand, the other armature assembly 116B and/or read/write head (s) 120B are not busy with a prior data transfer request at step 320, the interleaving scheme may proceed to step 330 at which point controller 132 causes the data transfer from or to the corresponding respective data storage surface(s) 112A-B to occur for the current request. Once the data transfer has been completed, the interleaving technique may cycle back to step 305 at which point another data transfer request is received by controller 132.

If at step 310 controller 132 had determined that armature assembly 116A and/or read/write head(s) 120A were busy with a prior data transfer request, the controller may determine at step 335 whether or not armature assembly 116B and/or read/write head(s) 120B are busy with a prior request. If so, the interleaving scheme may enter a wait loop 340 that continues until one or both armature assemblies 116A-B and corresponding respective read/write heads 120A-B are no longer busy with a prior request. If at step 335 controller 132 determines that armature assembly 116B and read/write head(s) 120B were not busy (and armature assembly 116A and read/write head(s) 120A were busy at step 310), at step 345 controller 132 activates armature assembly 116B so as to position read/write head(s) 120B at the proper location for performing the requested data transfer to or from the corresponding data storage surface(s) 112A-B. Step 345 may be referred to as a seek step. After seek step 345, at step 350 controller 132 determines whether or not the other armature assembly 116A and/or corresponding read/write head(s) 120A are busy with a prior request. If so, the interleaving scheme enters a stall loop 355 that continues to execute until the other armature assembly 116A and/or corresponding read/write head(s) 120A are done with the prior request. The effect of stall loop 355 is illustrated twice in FIG. 3, once in connection with data transfer request 212B and once in connection with data transfer request 212F.

If, on the other hand, the other armature assembly 116A and/or read/write head(s) 120A are not busy with a prior data transfer request at step 350, the interleaving scheme may proceed to step 360 at which point controller 132 causes the data transfer from or to the corresponding respective data storage surface(s) 112A-B to occur for the current request. Once the data transfer has been completed, the interleaving technique may cycle back to step 305 at which point another data transfer request is received by controller 132.

Those skilled in the art will readily appreciate that the interleaving scheme illustrated by flow diagram 300 of FIG. 4 is merely exemplary and that a variety of alternative interleaving schemes are possible and may be readily implemented with an understanding of the present disclosure.

Although the invention has been described and illustrated with respect to an exemplary embodiment thereof, it should be understood by those skilled in the art that the foregoing and various other changes, omissions and additions may be made therein and thereto, without parting from the spirit and scope of the present invention.

What is claimed is:

1. A disk drive system responsive to a plurality of data transfer requests received in a temporally sequential order and requiring a plurality of corresponding respective seeks and a plurality of corresponding respective data transfers, the disk drive system comprising:

a housing;

at least one platter rotatably mounted within said housing, said at least one platter having a first data storage surface containing a plurality of surficial data storage locations;

a first read/write head movably mounted within said housing and configured to read and write data to ones of said plurality of surficial data storage locations;

a first actuator assembly supporting said first read/write head and configured to move said first read/write head so that said first read/write head is able to access said plurality of surficial data storage locations;

at least a second read/write head movably mounted within said housing and configured to read and write data to ones of said plurality of surficial data storage locations;

a second actuator assembly supporting said second read/write head and configured to move said second read/write head independently of said first read/write head and so that said second read/write head is able to access said plurality of surficial data storage locations; and a controller operatively connected to said first actuator assembly and said second actuator assembly, said controller responsive to the plurality of data transfer requests by interleaving the plurality of corresponding respective seeks between said first actuator assembly and said second actuator assembly, said controller operatively configured to stall ones of the plurality of corresponding respective data transfers as needed to maintain the plurality of corresponding respective data transfers in an order consistent with the temporally sequential order of plurality of data transfer requests.

2. A disk drive system according to claim 1, wherein said controller configured to control said first and second actuator assemblies so as to perform said plurality of corresponding respective seeks in the temporally sequential order by alternating the plurality of corresponding respective seeks between said first and second actuator assemblies.

3. A disk drive system according to claim 1, wherein said controller configured to control said first and second read/write heads so as to perform said plurality of corresponding respective data transfers in the temporally sequential order by sequentially alternating the plurality of corresponding respective data transfers between said first and second read/write heads.

4. A disk drive system according to claim 3, wherein said controller is configured to control said first and second actuator assemblies so as to perform said plurality of corresponding respective seeks in the temporally sequential order by sequentially alternating the plurality of corresponding respective seeks between said first and second actuator assemblies.

5. A disk drive system according to claim 1, wherein said at least one platter comprises first and second data storage surfaces and said plurality of surficial data storage locations are contained on said first and second data storage surfaces, the disk drive system further comprising a first pair of read/write heads supported by said first actuator assembly and a second pair of read/write heads supported by said second actuator assembly, each of said first and second pairs of read/write heads containing a read/write head operable with said first data storage surface and a read/write head operable with said second data storage surface.

6. A disk drive system according to claim 1, further comprising a plurality of platters each including a first and second data storage surface, said plurality of surficial data storage locations being contained on said first and second data storage surfaces of said plurality of platters, the disk drive system further comprising a first set of read/write heads supported by said first actuator assembly and a second set of read/write heads supported by said second actuator assembly, each of said first and second sets of read/write heads having a read/write head operable with a corresponding respective one of said first and second storage surfaces of said plurality of platters.

7. A disk drive system according to claim 1, wherein each of said first and second actuator assemblies comprises a pivoting armature.

8. A method of controlling a disk drive that includes at least one platter having at least one storage surface, the disk drive further including at least two read/write heads in working relationship with the at least one storage surface, the method comprising:

receiving, in a temporally sequential order, a plurality of data transfer requests that require a plurality of corresponding respective seeks and a plurality of corresponding respective data transfers;

moving the at least two read/write heads so as to interleave said plurality of corresponding respective seeks with one another;

activating the at least two read/write heads so as to perform said plurality of corresponding respective data transfers relative to the at least one storage surface; and selectively stalling each of the plurality of corresponding respective data transfers as needed to maintain the plurality of corresponding respective data transfers in an order consistent with the temporally sequential order of the plurality of data transfer requests.

9. A method according to claim 8, wherein said activating of the at least two read/write heads includes activating the at least two read/write heads so as to interleave said plurality of corresponding respective data transfers.

10. A method according to claim 8, wherein said moving of the at least two read/write heads includes moving the at least two read/write heads so that said plurality of corresponding respective seeks are initiated in the temporally sequential order.

11. A method according to claim 10, wherein said moving of the at least two read/write heads includes moving the at least two read/write heads in an alternating manner.

12. A method according to claim 11, wherein said activating of the at least two read/write heads includes activating the at least two read/write heads so as to perform said plurality of corresponding respective data transfers in the temporally sequential order.

13. A method according to claim 12, wherein said activating of the at least two read/write heads includes activating the at least two read/write heads in an alternating manner.

14. A disk drive system responsive to a plurality of temporally sequential data transfer requests requiring a plurality of corresponding respective seeks and a plurality of corresponding respective data transfers, the disk drive system comprising:

a housing;

at least one platter rotatably mounted within said housing, said at least one platter having a first data storage surface containing a plurality of surficial data storage locations;

a first read/write head movably mounted within said housing and configured to read and write data to ones of said plurality of surficial data storage locations;

a first actuator assembly supporting said first read/write head and configured to move said first read/write head so that said first read/write head is able to access said plurality of surficial data storage locations;

at least a second read/write head movably mounted within said housing and configured to read and write data to one of said plurality of surficial data storage locations;

a second actuator assembly supporting said second read/write head and configured to move said second read/write head independently of said first read/write head and so that said second read/write head is able to access said plurality of surficial data storage locations; and a controller operatively connected to said first actuator assembly and said second actuator assembly, said controller responsive to the plurality of temporally sequential data transfer requests by performing said plurality of corresponding respective seeks in the temporally sequential order by alternating the plurality of corresponding respective seeks between said first actuator assembly and second actuator assembly, said controller operatively configured to stall ones of the plurality of corresponding respective data transfers as needed to maintain the plurality of corresponding respective data transfers in an order consistent with the temporally sequential order of the plurality of data transfer requests.

15. A disk drive system according to claim 14, wherein said controller is further responsive to the plurality of temporally sequential data transfer requests by performing said plurality of corresponding respective seeks in the temporally sequential order by sequentially alternating the plurality of corresponding respective data transfers between said first and second read/write heads.

16. A disk drive system according to claim 14, further comprising a plurality of platters each including a first and second data storage surface, said plurality of surficial data storage locations being contained on said first and second data storage surfaces of said plurality of platters, the disk drive system further comprising a first set of read/write heads supported by said first actuator assembly and a second set of read/write heads supported by said second actuator assembly, each of said first and second sets of read/write heads having a read/write head operable with a corresponding respective one of said first and second storage surfaces of said plurality of platters.

* * * * *